(12) United States Patent
Heitz

(10) Patent No.: US 12,145,499 B2
(45) Date of Patent: Nov. 19, 2024

(54) SLOW MOVING VEHICLE SAFETY DEVICE

(71) Applicant: Nick Heitz, Wapakoneta, OH (US)

(72) Inventor: Nick Heitz, Wapakoneta, OH (US)

(*) Notice: Subject to any disclaimer, the term of this patent is extended or adjusted under 35 U.S.C. 154(b) by 28 days.

(21) Appl. No.: 17/742,876

(22) Filed: May 12, 2022

(65) Prior Publication Data
US 2023/0365053 A1 Nov. 16, 2023

(51) Int. Cl.
*B60Q 1/30* (2006.01)
*B60W 40/105* (2012.01)

(52) U.S. Cl.
CPC .......... *B60Q 1/3015* (2022.05); *B60W 40/105* (2013.01); *B60W 2420/403* (2013.01)

(58) Field of Classification Search
CPC .............. B60Q 1/3015; B60W 40/105; B60W 2420/42
See application file for complete search history.

(56) References Cited

U.S. PATENT DOCUMENTS

| | | | | |
|---|---|---|---|---|
| 4,191,939 A * | 3/1980 | Bauman | ................. | B60Q 1/488 340/468 |
| 4,556,862 A | 12/1985 | Meinershagan | | |
| 4,787,163 A * | 11/1988 | Berg | ...................... | G09F 21/042 40/592 |
| 4,903,174 A * | 2/1990 | Busby | .................... | B60Q 1/305 362/397 |
| 5,119,067 A * | 6/1992 | Adell | ...................... | B60Q 1/547 340/471 |
| 5,124,845 A * | 6/1992 | Shimojo | ............... | B60Q 1/2665 362/135 |
| 5,682,138 A * | 10/1997 | Powell | ................... | B60Q 1/326 340/475 |
| 5,797,672 A * | 8/1998 | Dobert | .................... | F21S 43/14 362/800 |
| 5,940,012 A * | 8/1999 | Studebaker | ............ | B60Q 9/007 367/909 |
| D418,929 S | 1/2000 | Allen | | |
| 6,411,204 B1 * | 6/2002 | Bloomfield | ............ | B60Q 1/535 340/471 |

(Continued)

FOREIGN PATENT DOCUMENTS

WO WO2016014811 1/2016

*Primary Examiner* — Chico A Foxx
(74) *Attorney, Agent, or Firm* — Jacob M. Ward; Ward Law Office LLC

(57) ABSTRACT

A slow moving vehicle safety device for reducing accidents involving slow moving vehicles includes a housing, which defines an interior space and which is mountable to a rear end of a slow moving vehicle. A power module, a microprocessor, and a receiver are engaged to the housing and are positioned in the interior space. The power module and the receiver are operationally engaged to the microprocessor. The receiver is Global Positioning System enabled and receives coordinates and relays the coordinates to the microprocessor, which calculates a speed of the slow moving vehicle. A plurality of bulbs, which is engaged to a rear facing facet of the housing and is operationally engaged to the microprocessor, can selectively emit light of a variety of colors. The microprocessor is enabled to selectively actuate the bulbs to emit light of a respective color based on an associated speed of the slow moving vehicle.

15 Claims, 3 Drawing Sheets

(56) References Cited

U.S. PATENT DOCUMENTS

| | | | |
|---|---|---|---|
| 6,778,077 B1* | 8/2004 | DeGraaf | B60Q 1/32 340/426.33 |
| 6,865,835 B1* | 3/2005 | Webster | G09F 21/04 40/591 |
| 7,155,329 B2 | 12/2006 | Mepham | |
| 7,221,263 B2* | 5/2007 | Moore | A42B 3/0453 340/432 |
| 7,242,287 B1* | 7/2007 | Giovinazzo | B60Q 1/44 340/436 |
| 7,375,627 B2 | 5/2008 | Johnson | |
| 8,061,879 B2* | 11/2011 | Simmons | B60Q 1/305 362/546 |
| 8,552,852 B1* | 10/2013 | Hertz | B60Q 7/02 340/471 |
| 8,599,002 B2 | 12/2013 | Sekol | |
| 10,907,777 B2* | 2/2021 | Paine | F21V 23/002 |
| 11,041,610 B1* | 6/2021 | Smith | F21V 21/30 |
| 11,470,705 B2* | 10/2022 | Kim | B60Q 3/80 |
| 11,858,413 B2* | 1/2024 | Mazuir | B60Q 1/0035 |
| 2002/0133282 A1 | 9/2002 | Ryan | |
| 2003/0030554 A1* | 2/2003 | Yavitz | B60K 31/185 340/463 |
| 2003/0197606 A1* | 10/2003 | Epstein | B60Q 1/54 340/466 |
| 2004/0012488 A1* | 1/2004 | Schofield | B60Q 1/535 340/435 |
| 2004/0046678 A1* | 3/2004 | Grady, Jr. | B60Q 7/00 340/815.45 |
| 2004/0237876 A1* | 12/2004 | Huang | B60Q 7/00 116/63 T |
| 2005/0001433 A1* | 1/2005 | Seelin | G09F 21/04 290/44 |
| 2005/0264404 A1* | 12/2005 | Franczyk | G08G 1/096791 340/936 |
| 2006/0273891 A1 | 12/2006 | Quach | |
| 2007/0011928 A1* | 1/2007 | Wang | B60Q 7/00 40/612 |
| 2007/0040664 A1* | 2/2007 | Johnson | B60Q 1/444 340/467 |
| 2007/0241874 A1* | 10/2007 | Okpysh | B60Q 1/444 340/479 |
| 2012/0326967 A1* | 12/2012 | Gohng | B60W 50/14 345/156 |
| 2014/0309856 A1* | 10/2014 | Willson-Quayle | B60Q 1/444 701/36 |
| 2014/0336892 A1* | 11/2014 | Braunberger | G01C 23/00 701/70 |
| 2015/0043231 A1* | 2/2015 | Clark | F21S 43/00 362/485 |
| 2015/0203025 A1* | 7/2015 | Harmon | B60Q 1/22 701/36 |
| 2017/0190286 A1* | 7/2017 | Yavitz | G01S 19/52 |
| 2019/0234601 A1* | 8/2019 | Wescott | B60Q 1/54 |
| 2021/0188159 A1* | 6/2021 | Fukutaka | B60Q 1/543 |

\* cited by examiner

SLOW MOVING VEHICLE SAFETY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle safety devices and more particularly pertains to a new vehicle safety device for reducing accidents involving slow moving vehicles. The present invention discloses a vehicle safety device that indicates a speed of a slow moving vehicle by means of colored flashing lights on a triangular housing attached to a rear end of the slow moving vehicle.

(2) Description of Related Art Including Information Disclosed Under 37 CFR 1.97 and 1.98

The prior art relates to vehicle safety devices, which may comprise rear facing digital speedometers and devices that indicate one or more of braking, turning, and emergency stoppage. What is lacking in the prior art is a vehicle safety device comprising a housing, which is mountable to a rear end of a slow moving vehicle. Global Positioning System (GPS) enables calculation of a speed of the slow moving vehicle, which is indicated to following vehicles by selective emission of a respective color of light by a plurality of bulbs engaged to a rear facing facet.

BRIEF SUMMARY OF THE INVENTION

An embodiment of the disclosure meets the needs presented above by generally comprising a housing, which defines an interior space and which is configured to be mountable to a rear end of a slow moving vehicle. A power module, a microprocessor, and a receiver are engaged to the housing and are positioned in the interior space. The power module and the receiver are operationally engaged to the microprocessor. The receiver is Global Positioning System enabled and thus is configured to receive coordinates and to relay the coordinates to the microprocessor. The microprocessor is enabled to calculate a speed of the slow moving vehicle. A plurality of bulbs is engaged to a rear facing facet of the housing, is operationally engaged to the microprocessor, and is configured to selectively emit light of a variety of colors. The microprocessor is enabled to selectively actuate the bulbs to emit light of a respective color based on an associated speed of the slow moving vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
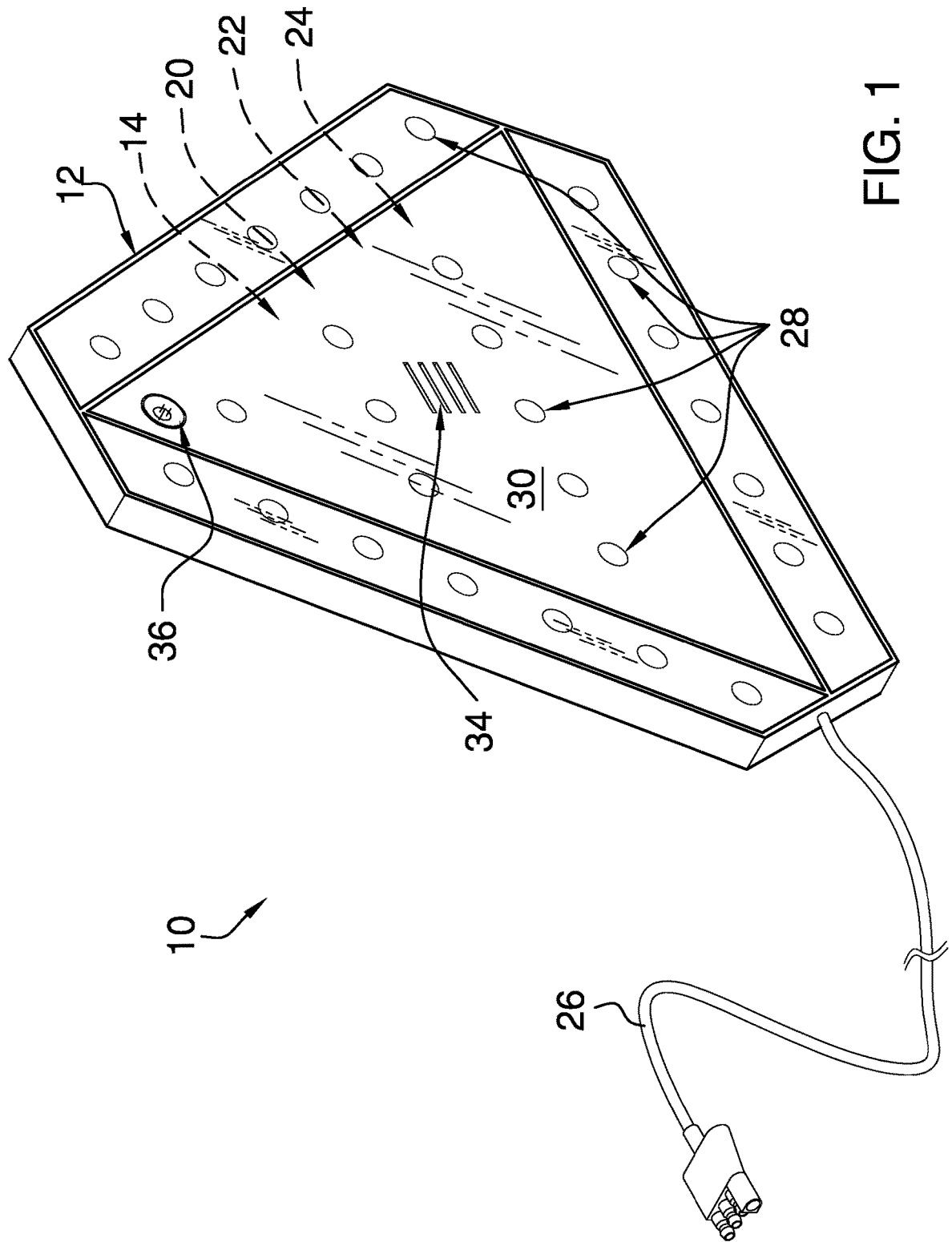
FIG. 1 is an isometric perspective view of a slow moving vehicle safety device according to an embodiment of the disclosure.
Figure 2:
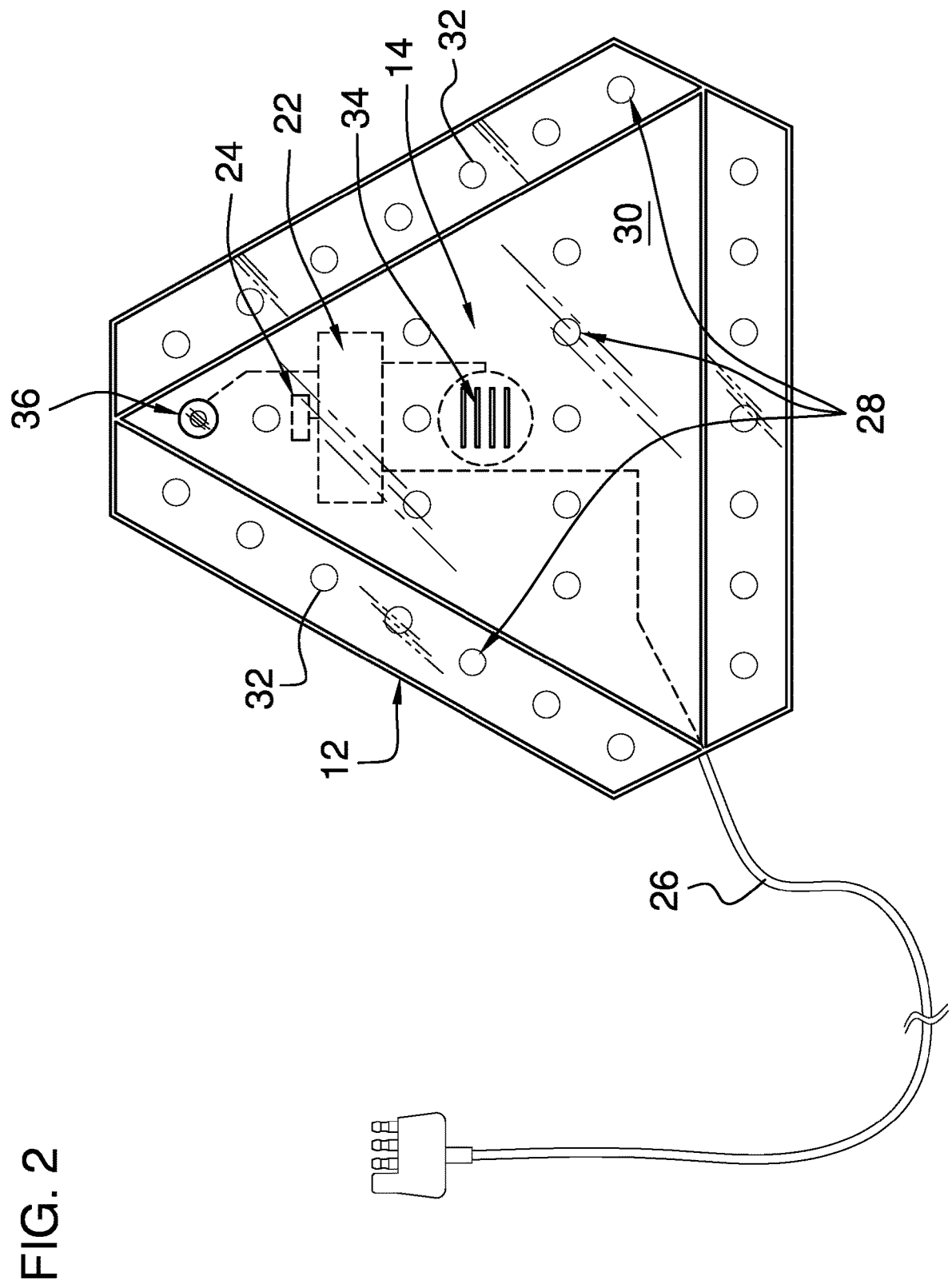
FIG. 2 is a front view of an embodiment of the disclosure.
Figure 3:
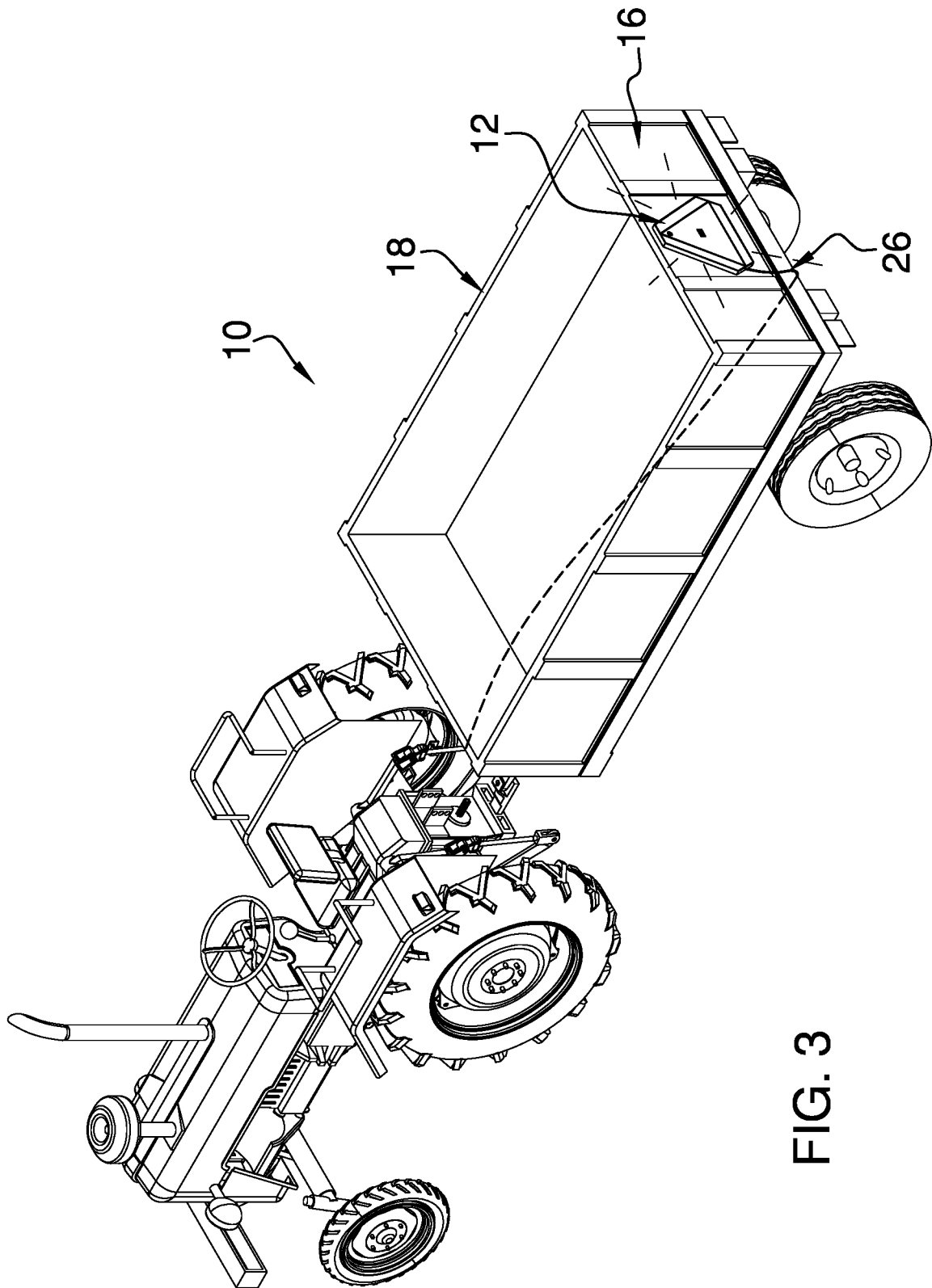
FIG. 3 is an in-use view of an embodiment of the disclosure.

With reference now to the drawings, and in particular to FIGS. 1 through 3 thereof, a new vehicle safety device embodying the principles and concepts of an embodiment of the disclosure and generally designated by the reference numeral 10 will be described.

As best illustrated in FIGS. 1 through 3, the slow moving vehicle safety device 10 generally comprises a housing 12, which defines an interior space 14 and which is substantially triangular, as shown in FIG. 2. The present invention also anticipates the housing 12 being circular, square, or the like. The housing 12 is configured to be mountable to a rear end 16 of a slow moving vehicle 18, such as, but not limited to, a tractor, a combine, a towed trailer, as shown in FIG. 3, or the like. The present invention anticipates the housing 12 being mountable to the slow moving vehicle 18 by means of magnets, fasteners, and the like.

A power module 20, a microprocessor 22, and a receiver 24 are engaged to the housing 12 and are positioned in the interior space 14. The power module 20 and the receiver 24 are operationally engaged to the microprocessor 22. The power module 20 comprises one or both of a battery (not shown) and a wiring harness 26. As shown in FIG. 3, the wiring harness 26 is configured to operationally engage an electrical circuit and an electronics control module of the slow moving vehicle 18. The receiver 24 is Global Positioning System enabled and thus is configured to receive coordinates and to relay the coordinates to the microprocessor 22. The microprocessor 22 is enabled to calculate a speed of the slow moving vehicle 18 based on the coordinates.

A plurality of bulbs 28 is engaged to a rear facing facet 30 of the housing 12, is operationally engaged to the microprocessor 22, and is configured to selectively emit light of a variety of colors. Each bulb 28 comprises a light emitting diode 32 configured to selectively emit light of red color, yellow color, and green color. The microprocessor 22 is enabled to selectively actuate the bulbs 28 to emit light of a respective color based on an associated speed of the slow moving vehicle 18. For example, the microprocessor 22 may actuate the bulbs 28 to emit red, yellow, and green light for speeds of less than about 40 kilometer per hour (kph), from about 40 kph to about 80 kph, and above about 80 kph, respectively.

Alternatively, the microprocessor 22 may actuate the bulbs 28 to emit red, yellow, and green light based on a speed of the slow moving vehicle 18 relative to a posted speed for the road upon which the slow moving vehicle 18 is traveling. For example, red light may be emitted if the slow moving vehicle 18 is traveling at a speed of about 30% or less of the posted speed, yellow light if travelling at a speed of about 30% to about 75% of the posted speed, and green light if travelling above about 75% of the posted speed.

The microprocessor 22 selectively actuates the bulbs 28 intermittently so that the bulbs 28 are flashing, thereby increasing a likelihood of the slow moving vehicle safety device 10 drawing notice from a driver of a vehicle approaching from the rear end 16 of the slow moving vehicle 18.

The slow moving vehicle safety device 10 also may comprise a speaker 34, which is engaged to the rear facing facet 30 of the housing 12 and which is operationally engaged to the microprocessor 22. The microprocessor 22 can selectively actuate the speaker 34 to broadcast an alarm, such as when the slow moving vehicle 18 is being driven in reverse.

The slow moving vehicle safety device 10 also may comprise a camera 36, which is engaged to the rear facing facet 30 of the housing 12 and which is operationally engaged to the microprocessor 22. The camera 36 is configured to selectively capture an image of the area proximate to the rear end 16 of the slow moving vehicle 18. The microprocessor 22 can selectively actuate the camera 36 to capture the image and can relay the image to a display (not shown) that is visible to an operator of the slow moving vehicle 18 to facilitate driving of the slow moving vehicle 18 in reverse.

In use, the housing 12 is simply affixed to the rear end 16 of the slow moving vehicle 18 and then the slow moving vehicle 18 is operated normally. The slow moving vehicle safety device 10 provides notice to drivers who approach the slow moving vehicle 18 so that they can take precautions to avoid accidents.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A safety system for a slow moving vehicle comprising:
a housing defining an interior space and being configured to be removably mountable to a rear end of a slow moving vehicle, the housing being shaped as a slow-moving vehicle emblem to provide a visual caution signal to approaching vehicles where a rear facet of the housing has a central triangular portion and each edge of the central triangular portion is flanked by a trapezoidal portion, a plurality of bulbs engaged in the rear facet, the plurality of bulbs including a row of bulbs disposed along a length of each one of the trapezoidal portions;
a power module engaged to the housing and positioned in the interior space;
a microprocessor engaged to the housing, positioned in the interior space, and operationally engaged to the power module and the plurality of bulbs; and
a receiver engaged to the housing, positioned in the interior space, and operationally engaged to the microprocessor, the receiver being Global Positioning System enabled, wherein the receiver is configured for receiving coordinates and for relaying the coordinates to the microprocessor, enabling the microprocessor for determining a calculated speed of the slow moving vehicle,
wherein the microprocessor is configured to continuously control an emission of light from the plurality of bulbs to create the visual caution signal to approaching vehicles, where the microprocessor selects a particular color of light to be emitted from each of the plurality of bulbs based on the calculated speed of the slow moving vehicle, and the microprocessor is configured to change the particular color of light when the calculated speed of the slow moving vehicle changes from a first speed range to a second speed range where the first speed range and the second speed range do not overlap.

2. The slow moving vehicle safety device of claim 1, wherein the power module comprises one or both of a battery and wiring harness, the wiring harness being configured for operationally engaging an electrical circuit and an electronics control module of the slow moving vehicle.

3. The slow moving vehicle safety device of claim 2, further including a camera engaged to the rear facing facet of the housing, operationally engaged to the microprocessor, and being configured for selectively capturing an image of the area proximate to the rear end of the slow moving vehicle, enabling the microprocessor for selectively actuating the camera for capturing the image and for relaying the image to a display visible to an operator of the slow moving vehicle for facilitating driving of the slow moving vehicle in reverse.

4. The slow moving vehicle safety device of claim 2, wherein the power module comprises the wiring harness, the wiring harness being configured for operationally engaging an electrical circuit and an electronics control module of the slow moving vehicle.

5. The slow moving vehicle safety device of claim 1, wherein the microprocessor selectively actuates the bulbs intermittently, such that the bulbs are flashing.

6. The slow moving vehicle safety device of claim 1, wherein each bulb comprises a light emitting diode configured for selective emission of light of red color, yellow color, and green color.

7. The slow moving vehicle safety device of claim 1, further including a speaker engaged to the rear facing facet of the housing and operationally engaged to the microprocessor, enabling the microprocessor for selectively actuating the speaker for broadcasting an alarm.

8. The slow moving vehicle safety device of claim 1, wherein the slow moving vehicle is a vehicle (a) that is 4-wheeled, (b) whose speed attainable in 1.6 km (1 mile) is more than 32 kilometers per hour (20 miles per hour) and not more than 40 kilometers per hour (25 miles per hour) on a paved level surface, and (c) whose gross vehicle weight rating is less than 1,361 kilograms (3,000 pounds).

9. A safety system for a slow moving vehicle comprising:
the slow moving vehicle;
a housing defining an interior space and being configured to be removably mountable to a rear end of the slow moving vehicle, the housing being shaped as a slow-moving vehicle emblem to provide a visual caution signal to approaching vehicles where a rear facet of the housing has a central triangular portion and each edge of the central triangular portion is flanked by a trapezoidal portion, a plurality of bulbs engaged in the rear facet, the plurality of bulbs including a row of bulbs disposed along a length of each one of the trapezoidal portions;
a power module engaged to the housing and positioned in the interior space;
a microprocessor engaged to the housing, positioned in the interior space, and operationally engaged to the power module and the plurality of bulbs; and
a receiver engaged to the housing, positioned in the interior space, and operationally engaged to the microprocessor, the receiver being Global Positioning System enabled, wherein the receiver is configured for receiving coordinates and for relaying the coordinates to the microprocessor, enabling the microprocessor for determining a calculated speed of the slow moving vehicle;
wherein the microprocessor is configured to continuously control an emission of light from the plurality of bulbs to create the visual caution signal to approaching vehicles, where the microprocessor selects a particular color of light to be emitted from each of the plurality of bulbs based on the calculated speed of the slow moving vehicle, and the microprocessor is configured to change the particular color of light when the calculated speed of the slow moving vehicle changes from a first speed range to a second speed range where the first speed range and the second speed range do not overlap.

10. The slow moving vehicle safety system of claim 9, wherein the power module comprises one or both of a battery and wiring harness operationally engaged to an electrical circuit and an electronics control module of the slow moving vehicle.

11. The slow moving vehicle safety system of claim 10, further including a camera engaged to the rear facing facet of the housing, operationally engaged to the microprocessor, and being configured for selectively capturing an image of the area proximate to the rear end of the slow moving vehicle, enabling the microprocessor for selectively actuating the camera for capturing the image and for relaying the image to a display visible to an operator of the slow moving vehicle for facilitating driving of the slow moving vehicle in reverse.

12. The slow moving vehicle safety system of claim 9, wherein the microprocessor selectively actuates the bulbs intermittently, such that the bulbs are flashing.

13. The slow moving vehicle safety system of claim 9, wherein each bulb comprises a light emitting diode configured for selective emission of light of red color, yellow color, and green color.

14. The slow moving vehicle safety system of claim 9, further including a speaker engaged to the rear facing facet of the housing and operationally engaged to the microprocessor, enabling the microprocessor for selectively actuating the speaker for broadcasting an alarm.

15. A safety system for a slow moving vehicle comprising:
a housing defining an interior space and being configured to be removably mountable to a rear end of a slow moving vehicle, the housing being shaped as a slow-moving vehicle emblem to provide a visual caution signal to approaching vehicles where a rear facet of the housing has a central triangular portion and each edge of the central triangular portion is flanked by a trapezoidal portion, a plurality of bulbs engaged in the rear facet, the plurality of bulbs including a row of bulbs disposed along a length of each one of the trapezoidal portions;
a power module engaged to the housing and positioned in the interior space, the power module comprising one or both of a battery and wiring harness, the wiring harness being configured for operationally engaging an electrical circuit and an electronics control module of the slow moving vehicle;
a microprocessor engaged to the housing, positioned in the interior space, and operationally engaged to the power module;
a receiver engaged to the housing, positioned in the interior space, and operationally engaged to the microprocessor, the receiver being Global Positioning System enabled, wherein the receiver is configured for receiving coordinates and for relaying the coordinates to the microprocessor, enabling the microprocessor for determining a calculated speed of the slow moving vehicle;
a speaker engaged to the rear facing facet of the housing and operationally engaged to the microprocessor, enabling the microprocessor for selectively actuating the speaker for broadcasting an alarm; and
a camera engaged to the rear facing facet of the housing, operationally engaged to the microprocessor, and being configured for selectively capturing an image of an area proximate to the rear end of the slow moving vehicle, enabling the microprocessor for selectively actuating the camera for capturing the image and for relaying the image to a display visible to an operator of the slow moving vehicle for facilitating driving of the slow moving vehicle in reverse,
wherein the microprocessor is configured to continuously control an emission of light from the plurality of bulbs to create the visual caution signal to approaching vehicles, where the microprocessor selects a particular color of light to be emitted from each of the plurality of bulbs based on the calculated speed of the slow moving vehicle, and the microprocessor is configured to change the particular color of light when the calculated speed of the slow moving vehicle changes from a first speed range to a second speed range where the first speed range and the second speed range do not overlap.

* * * * *